J. DAILEY.
Beer Measure.
No. 57,097.
Patented Aug. 14, 1866.
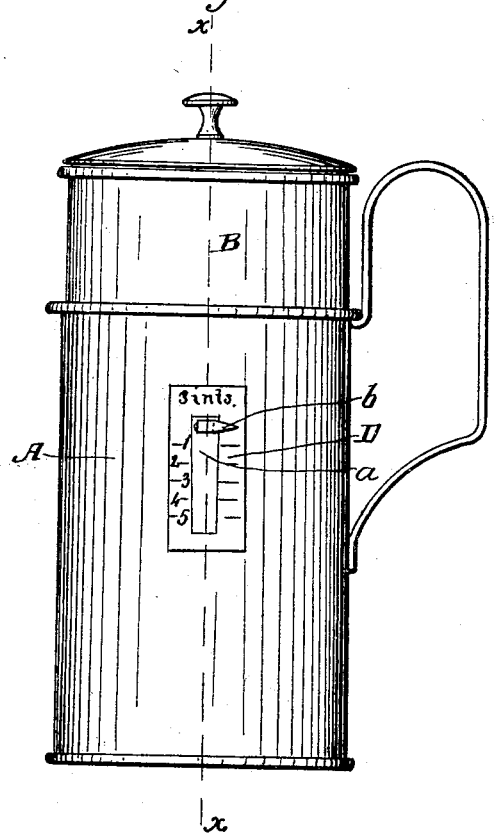
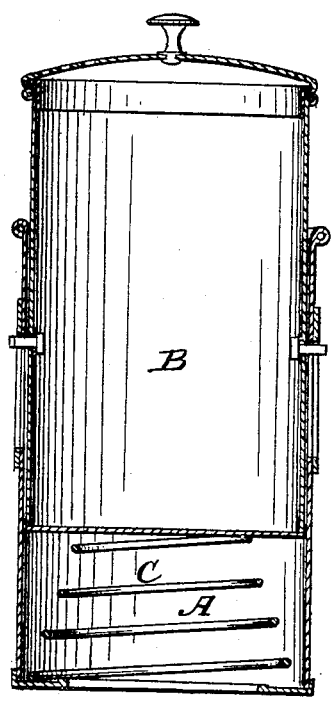
Witnesses:
Jas. A. Service
J. W. B. Corrington
Inventor:
James Dailey
Per Munn &
Attorneys

UNITED STATES PATENT OFFICE.

JAMES DAILY, OF ALBANY, NEW YORK.

IMPROVEMENT IN LIQUID-MEASURES.

Specification forming part of Letters Patent No. 57,097, dated August 14, 1866.

*To all whom it may concern:*

Be it known that I, JAMES DAILY, of Albany, in the county of Albany and State of New York, have invented a new and Improved Beer-Measure; and I do hereby declare that the following is a full, clear, and exact description thereof, which will enable others skilled in the art to make and use the same, reference being had to the accompanying drawings, forming part of this specification, in which—

Figure 1 is a side elevation of my invention. Fig. 2 is a vertical central section taken on the plane of the line $x\ x$, Fig. 1.

Similar letters of reference indicate like parts.

The object of this invention is to provide a convenient device for measuring fermented liquors while the same are in a foaming or quiet state without, in the former case, waiting for the foam to settle.

My invention consists in the construction of two cylindrical or other proper-shaped vessels, the one of a size to slide vertically within the other, in combination with a spiral or other proper spring and an index and graduated scale, as will be hereinafter described.

A designates the larger vessel, which is cylindrical in shape. Into this is fitted to slide up and down freely another cylindrical vessel, B. Into this latter vessel the liquor to be measured is poured. In the vessel A, underneath the vessel B, there is placed a spiral spring, C, which is so made that its compression will indicate degrees of weight.

Slots $a$ are made through opposite sides of the vessel A, and a graduated plate, D, indicating pints, quarts, &c., placed around the slot. Indices $b$—one for each plate D—are secured to the vessel B, so as to protrude through the slot $a$ and travel along the graduated scale-plate D.

From the above description it will be seen that the liquid is measured by its weight, which, by means of the spring C, is indicated by pints, quarts, &c., on the index-plate D. Therefore it matters little whether or not the liquor being measured contains foam, the true measure or weight of the liquid will be given, and this without the dealer being obliged to wait for the foam to settle, as is necessary with ordinary graduated measures.

What I claim as new, and desire to secure by Letters Patent, is—

1. The combination of the vessels A and B with a spiral or other spring, C, and index-plates (one or more) D and indices $b$, substantially as shown and described, for the purpose specified.

2. The spiral spring C, in combination with the vessels A and B, substantially as and for the purpose specified.

JAMES DAILY.

Witnesses:
R. C. BENTLEY,
DE WITT C. RAMSEY.